United States Patent [19]

Brace et al.

[11] 4,422,206
[45] Dec. 27, 1983

[54] ICE SCRAPER

[76] Inventors: Arthur W. Brace, 48 N. Lincoln, Lombard, Ill. 60148; James M. Chmielewski, 8 Waynewood Dr., West Chicago, Ill. 60185

[21] Appl. No.: 389,609

[22] Filed: Jun. 18, 1982

[51] Int. Cl.³ .............................................. B60S 1/04
[52] U.S. Cl. ................................... 15/236 R; 15/245; 30/172
[58] Field of Search ................. 15/236 R, 236 A, 245, 15/242, 93 R, 104.16; 30/169, 172

[56] References Cited

U.S. PATENT DOCUMENTS

| 666,633 | 1/1901 | Farmer | 15/236 R X |
|---|---|---|---|
| 1,171,212 | 2/1916 | Kinne | 30/169 |
| 3,133,301 | 5/1964 | Helminen | 15/245 |
| 4,164,801 | 8/1979 | Thomas | 15/236 R |

*Primary Examiner*—Edward L. Roberts
*Attorney, Agent, or Firm*—Edmond T. Patnaude

[57] ABSTRACT

A tool for scraping ice or frost from the windows of automotive vehicles has a concavo-convex plastic body provided with a pair of aligned slots separating the edge of the body into two arcuate scraping edges and a handle connected to the body between the adjacent ends of the two slots.

5 Claims, 6 Drawing Figures

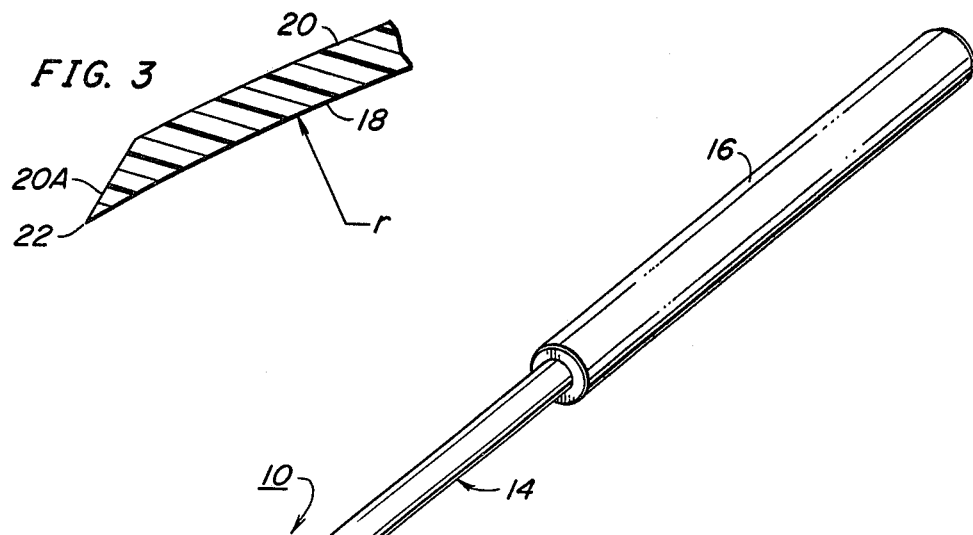
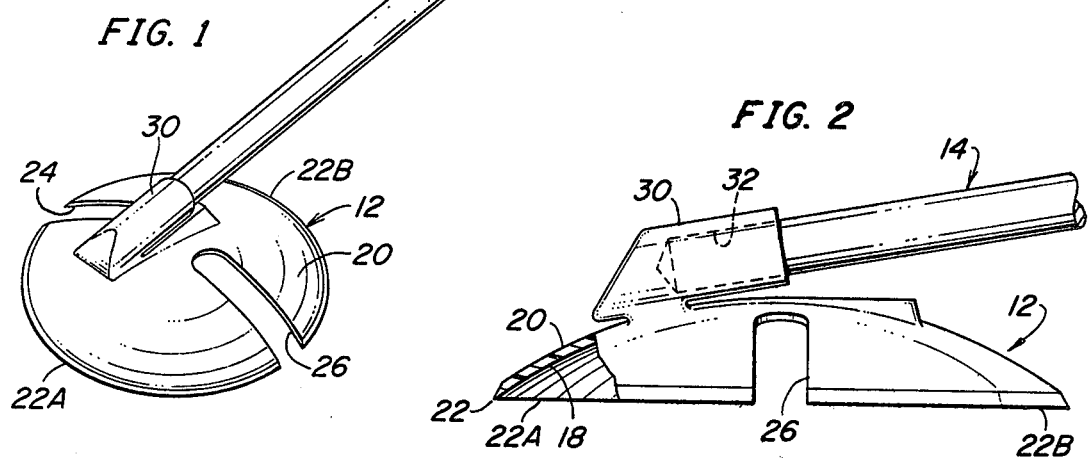
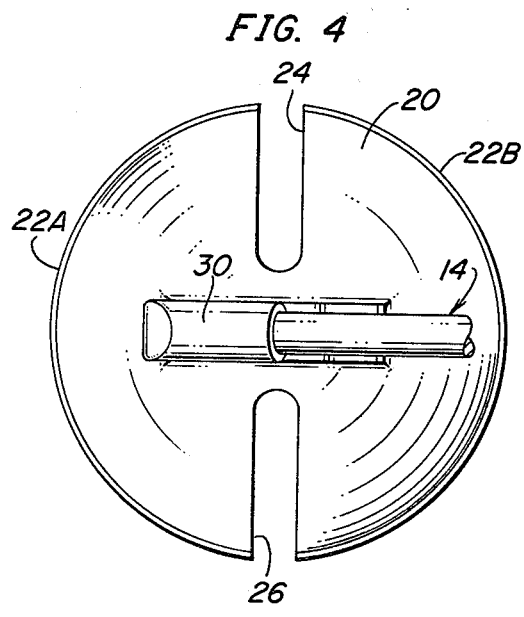
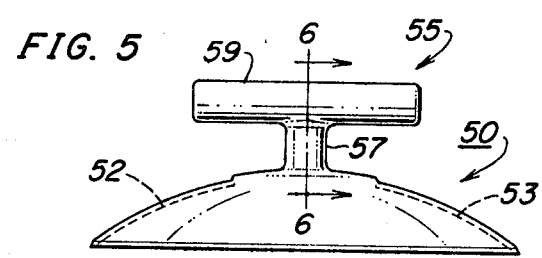
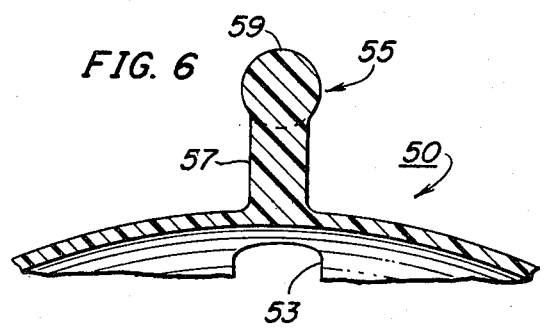

ICE SCRAPER

The present invention relates in general to tools for use in scraping ice and frost from the windshields and other windows of automotive vehicles, and it relates in particular to a novel ice scraping tool having two arcuate scraping edges and an overall flexibility to permit both edges to be firmly and simultaneously pressed against curved windows during scraping.

BACKGROUND OF THE INVENTION

The most common method of removing ice from the windshields and other windows of automotive vehicles is to manually scrape it off with a tool or implement having a sharp, blade-like cutting edge. In order to avoid scratching of the window the cutting edge should be softer than the tempered window glass. On the other hand it must be sufficiently hard to effectively separate or scrape the ice from the window.

Various blade shapes have been disclosed in the prior art, but the straight blade is still the most widely used configuration even though it is not entirely suited for scraping ice from the curved surfaces of windshields and rear windows of present day vehicles.

There is described in U.S. Pat. No. 4,164,801 an ice scraper in which a straight blade is divided into a plurality of resilient scraping fingers. U.S. Pat. No. 3,133,301 describes a two-part ice scraper having a circular scraping element mounted to a flexible, dished body member, and U.S. Pat. No. 2,532,429 describes a windshield cleaning device having a plurality of concentric, circular scraping edges.

SUMMARY OF THE INVENTION

Briefly, there is provided in accordance with the present invention a new and improved ice scraper which may be molded of a strong, relatively rigid plastic material and yet have sufficient flexibility to conform to curved window surfaces. The scraper comprises a concavo-convex body having sharp front and rear arcuate scraping edges separated by two mutually aligned radial slots.

A handle, which may be molded as an integral part of the body, is connected to the concave surface thereof intermediate the inner ends of the slots. In a preferred embodiment of the invention the handle is a short length of rod connected to the body in a manner providing limited spring action in a plane perpendicular to the plane containing the two scraping edges.

The scraping edges are formed by the intersection of the inner spherical surface of the body member and an outer frusto-conical external surface. The angle of the latter surface determines the effectiveness of the tool inasmuch as the entire scraping edges lies flat against the window during use thereof. Accordingly, maximum efficiency of operation is assured.

GENERAL DESCRIPTION OF THE INVENTION

The present invention will be better understood by a reading of the following detailed description taken in connection with the accompanying drawing wherein:

FIG. 1 is a perspective view of an ice scraping tool constituting a preferred embodiment of the invention;

FIG. 2 is a fragmentary, partially sectioned view of the tool of FIG. 1;

FIG. 3 is an enlarged, sectional view of a scraping edge of the tool shown in FIG. 2;

FIG. 4 is a top view of the tool shown in FIG. 2;

FIG. 5 is a side view of an ice scraping tool constituting another embodiment of the invention; and FIG. 6 is a cross-sectional view taken along the line 6—6 of FIG. 5.

DETAILED DESCRIPTION OF THE INVENTION

Referring particularly to FIG. 1, there is shown an ice scraping tool 10 comprising a main body member 12 having an elongated handle 14 attached thereto. The handle 14 has an enlarged portion 16 at its distal end to facilitate its being gripped by the hand of the person using the tool.

The body member 12 is formed of a relatively rigid, strong plastic material which will not scratch window glass when the edges thereof are scraped across the surface of the glass. With further reference to FIG. 2 it may be seen that the body member 12 is concavo-convex or dished member having a concave bottom surface 18 and a convex upper surface 20. A sharp arcuate scraping edge 22 is provided at the intersection of the upper and lower surfaces. More particularly, and as best shown in FIG. 3, the concave surface 18 has a radius r and the outer portion 20A of the upper surface 20 is frusto-conical. The intersection of the frusto-conical and spherical surfaces provides a sharp, structurally durable scraping edge.

In order to provide the tool with sufficient flexibility to conform to a curved windshield or the like, the body member 12 is provided with a pair of aligned radial slots 24 and 26 which separate the otherwise circular rim into two arcuate scraping edges 22A and 22B. The principal longitudinal axes of the slots 24 and 26 lie in a vertical plane which is perpendicular to the vertical plane containing the principal longitudinal axis of the handle 14. Therefore, when the tool is used, the scraping edge 22A provides a front edge which is pushed along the surface being scraped while the scraping edge 22B provides a rear edge which is pulled along the surface being scraped.

In the preferred embodiment of the invention the handle 14 is attached to the body member 12 by a somewhat flexible, resilient connection which permits a limited degree of movement of the handle relative to the plane of the scraping edge 22 when the scraping tool is in use. To this end the body member 12 has a connector portion 30 which is preferably integral with the main dished portion of the body member, but which can be separately molded and permanently bonded to the main body. The connector portion 30 is generally tubular and has a cylindrical hole 32 into which the correspondingly shaped end portion of the handle 14 is press-fitted as shown in FIG. 2. The portion 30 is located a substantial distance forwardly of the center of the dish shaped portion of the body and the principal longitudinal axes of the handle 14 extends at an angle of about ten degrees relative to the plane of the scraping edge 22. Hence, when pressure is exerted on the handle during a scraping operation, the handle 14 may swing through a limited angle of a few degrees in the plane perpendicular to the plane of the scraping edge.

Referring to FIGS. 5 and 6 there is shown an alternative embodiment of the invention in the form of an ice scraping tool 50. The tool 50 has a main body portion which is substantially identical to that of the tool 10. Accordingly, it is molded of a relatively hard, durable plastic such as Delrin and is dished or concavo-convex having two arcuate scraping edges separated by a pair of aligned, radial slots 52, 53. Molded integral with the body is a handle 55 comprising an upstanding post portion 57 and a hand-hold crosspiece 59. The handle 55 is not resiliently connected to the body portion of the tool, but the radial slots 52 and 53 provide sufficient resiliance to permit the entire scraping edge to be pressed against the curved surface of, for example, the windshield or rear window of an automobile.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:
1. A scraping tool comprising
   a dished member formed of plastic and having first and second arcuate scraper edges lying in a common plane,
   said member having first and second aligned radial slots separating the rim of said dished member into said two scraper edges.
2. A scraping tool according to claim 1 wherein said dished member has a generally spherical inner surface and the outer surface of the rim portion of said member is frusto-conical.
3. A scraping tool according to claim 1 comprising a handle extending from said dished member at a location intermediate the inner ends of said slots.
4. A scraping tool according to claim 3 wherein said handle is attached to said member by means of a resilient connection.
5. A scraping tool according to claim 4 wherein said handle is attached to said dished member at a location spaced from the center of said dished member, and
   said handle is an elongated member connected at one end to said dished member and lying in a plane perpendicular to the plane of said scraper edges.

* * * * *